(12) United States Patent
Vecrin et al.

(10) Patent No.: US 6,540,202 B1
(45) Date of Patent: Apr. 1, 2003

(54) MOLD MATRIX PIN WITH INTEGRAL SPACING MEANS

(75) Inventors: Denis Vecrin, Montreal, Quebec (CA); George Iatan, Cotes St.-Luc (CA)

(73) Assignee: DBM Reflex Enterprises, Inc., Laval (CA)

( * ) Notice: Subject to any disclaimer, the term of this patent is extended or adjusted under 35 U.S.C. 154(b) by 0 days.

(21) Appl. No.: 09/507,513

(22) Filed: Feb. 18, 2000

(30) Foreign Application Priority Data

Feb. 23, 1999 (CA) .............................................. 2262726

(51) Int. Cl.$^7$ .............................................. B29D 11/00
(52) U.S. Cl. .................... 249/187.1; 425/808; 359/530; 204/281
(58) Field of Search ................. 425/190, 808; 249/187.1; 264/1.9, 2.5; 359/530; 204/281

(56) References Cited

U.S. PATENT DOCUMENTS

| | | | | |
|---|---|---|---|---|
| 1,591,572 A | * | 7/1926 | Stimson | .................... 65/362 |
| 3,069,721 A | * | 12/1962 | Arni et al. | .................. 425/403 |
| 3,258,840 A | | 7/1966 | Hedgewick et al. | ........ 29/471.1 |
| 3,277,535 A | * | 10/1966 | Rupert | ........................ 425/469 |
| 3,417,959 A | * | 12/1968 | Schultz | ........................ 249/117 |
| 3,443,281 A | * | 5/1969 | Walby | ........................ 249/141 |
| 4,066,236 A | * | 1/1978 | Lidner | ........................ 249/160 |
| 4,733,946 A | | 3/1988 | Cossetti | ..................... 350/321 |
| 5,565,221 A | | 10/1996 | Caroli | ........................ 425/190 |
| 6,171,095 B1 | * | 1/2001 | Balint et al. | ................. 425/195 |

FOREIGN PATENT DOCUMENTS

| CA | 2060703 | 10/1995 | ............. F21V/7/00 |
|---|---|---|---|
| CA | 2120996 | 10/1995 | ........... C23C/16/06 |

* cited by examiner

Primary Examiner—Jan H. Silbaugh
Assistant Examiner—Donald Heckenberg
(74) Attorney, Agent, or Firm—Walter W. Duft

(57) ABSTRACT

Mold pins for use in a mold matrix, as used in the production of electroforms, are provided with means to alter the longitudinal axis of the pins relative to that of adjacent pins so that the longitudinal axis of the pins are tapered with respect to one another towards the operative ends of the pins. In one embodiment of the invention a dowel is inserted into a sidewall of the pin and extends normal thereto to space the pin from an adjacent one. In another embodiment, a spacing member of a desired thickness is applied to the shank of the pin at a location remote from the operative end thereof.

8 Claims, 6 Drawing Sheets

MOLD MATRIX PIN WITH INTEGRAL SPACING MEANS

FIELD OF THE INVENTION

This invention relates to mold pins and in particular to optic or reflex pins having means thereon to space them from adjacent pins when a plurality of the pins are grouped in an pin master or mold matrix.

While the invention is applicable to either optic pins or reflex pins used in a mold matrix, a reflex pin or pins are used as examples only and the specification is not limited only to that form of pin.

BACKGROUND OF THE INVENTION

A pin master or matrix comprises a plurality of mold pins, for example reflex pins or a combination of optic pins and reflex pins, which are assembled into a specific configuration. The matrix (as it will be referred to hereinafter) is used to produce an electroform, by electrodeposition, or other suitable means, and the electroform so produced is then used to manufacture a mold which receives suitable mold material, such as thermoplastic, under pressure for making lens and/or reflective devices such as automobile lamp assemblies.

The outer lens portion of automotive lamp assemblies include sections made up of reflex elements, the purpose of which is to reflect light from an exterior light source directed at the lamp assembly. The reflex portion of a lamp assembly provides the reflective brilliance to a light source directed at the assembly i.e. from the headlights of a vehicle which are being directed at a rear lamp assembly incorporating the reflex elements. The brilliance of the reflective elements must meet standards set by various countries.

Lamp assemblies and their lenses for automotive vehicles are relatively simple to manufacture when the areas of the vehicles on which they are mounted are relatively flat. However, bodies of automotive vehicles are now smoothly contoured both on rear surfaces as well as front surfaces thereof in order to reduce the coefficient of drag and it has become more difficult to manufacture suitable lenses that will blend into these contours and which will still provide the required amount of reflectivity and brilliance required by law.

There is also a requirement for single, unitary lenses to meet the above mentioned needs for vehicles having smoother, rounded styling but which can also be tailored to the specific functions of the lamp assembly for a particular vehicle. For example, to meet safety requirements of certain countries, lamp assemblies must have lenses that extend into portions of the side surfaces of the vehicle as well as surfaces to the front and rear thereof. There are often compound curvatures to the surfaces to which the lenses must match.

One example of an automotive vehicle lens using reflex elements is shown in Canadian Patent 2,060,703 issued Oct. 17, 1995 to DBM Reflex Enterprises Inc. This patent illustrates a lens which has a combination of optical elements and reflex elements.

Conventionally, reflex elements, sometimes in combination with optical elements, are manufactured by assembling a large plurality of mold pins (reflex and if necessary optical pins) into a matrix and an electroform is then made by electro-depositing metal on the shaped ends of the mold pins in the matrix and then using the resulting electroform in a mold where plastic material is injected to form the reflected surfaces.

It is important in the preparation of a matrix to have the pins oriented properly to provide the directional brilliance and reflectivity in the finished product and it is therefore necessary, in the manufacturer of a reflective matrix, to ensure that the required reflectivity in the finished product is not lost in the curved portion thereof while matching the contour of a vehicle body.

There are several examples of arranging reflex pins in a bundle or matrix so that they provide the reflective brilliance in the resulting lenses, taking into account the above mentioned body contours of vehicles to which the lenses are attached.

One example of an attempt to meeting the requirements is shown in U.S. Pat. No. 4,733,946 of Mar. 29, 1988 to Cossetti. In this publication, reflex pins are machined such that their side surfaces are tapered towards the face of the matrix so that when the elements are grouped in a matrix, the tapered pins will provide the necessary curvature. However, while this may be effective, it is a very time consuming and very expensive manner in dealing with the problem.

In U.S. Pat. No. 5,565,221 of Oct. 15, 1996 assigned to DBM Reflex Enterprises Inc., the problem referred to above is addressed by providing spacers or wedges for use in combination with mold elements such as optic or reflex pins, in the pin master or matrix assembly. The spacers or wedges are selectively located between rows or banks of mold elements in the matrix to provide the required orientation to the optic and/or reflex pins. Thus the necessary reflective surfaces from the prisms will return the requirement amount of reflected light toward a source even when the surface of the product is on a contoured portion of a lamp assembly on a vehicle. The spacer consists of an elongated body having flat parallel side edges and converging faces which taper towards one another from a major edge to a minor edge. One of the faces has a surface profile to fit the profile of juxtaposed elements in the matrix assembly. These spacers or wedges do function well but problems have been encountered in bundling them in the matrix and maintaining the bundles with the elements in proper orientation.

Another example of the prior art is shown in the patent to Hedgewick U.S. Pat. No. 3,258,840 of Jul. 5, 1966.

SUMMARY OF THE INVENTION

The present invention addresses the problems referred to above by providing spacing means for use in combination with mold elements such as optic or reflex reflector pins, in the pin block or matrix assembly. The spacing means can be selectively located in producing a continuously variable pin axis electroform so as to alter the longitudinal axis of the pins relative to that of adjacent pins whereby the longitudinal axis of the pins are tapered with respect to one another towards the reflex ends of the pins.

In accordance with one broad aspect, the invention relates to a mold pin for use in a matrix in the production of a variable pin axis electroform, the pin having means thereon to effect variation in the longitudinal axis of the pin relative to that of adjacent pins in the matrix so that the longitudinal axis of the pins are tapered with respect to one another towards the operative ends thereof.

According to another broad aspect, the invention relates to a mold pin for use in a mold matrix where the pin has means to alter the longitudinal axis thereof relative to that of adjacent pins in the matrix so that the longitudinal axis of the pins are tapered with respect to one another toward the operative end of the pins. The axis altering means consists of a spacing member mounted on the pin at a location remote from the operative end thereof to space the remote location of the pin from adjacent pins in the matrix.

According to a still further aspect, the invention relates to the method of providing a mold pin with means for varying the longitudinal axis thereof relative to adjacent pins in a mold matrix. The method comprises the steps of (a) selecting a location on a sidewall of the pin; (b) drilling a socket in the side wall normal to the longitudinal axis of the pin; and (c) inserting a dowel in the socket whereby the dowel extends normal to the longitudinal axis of the pin and the length of protrusion of the dowel sets the degree of taper of the pin relative to an adjacent pin in the matrix.

DESCRIPTION OF THE DRAWINGS

The invention is illustrated by way of example in the accompanying drawings in which.

DETAILED DESCRIPTION OF THE PREFERRED EMBODIMENTS

Figure 1:
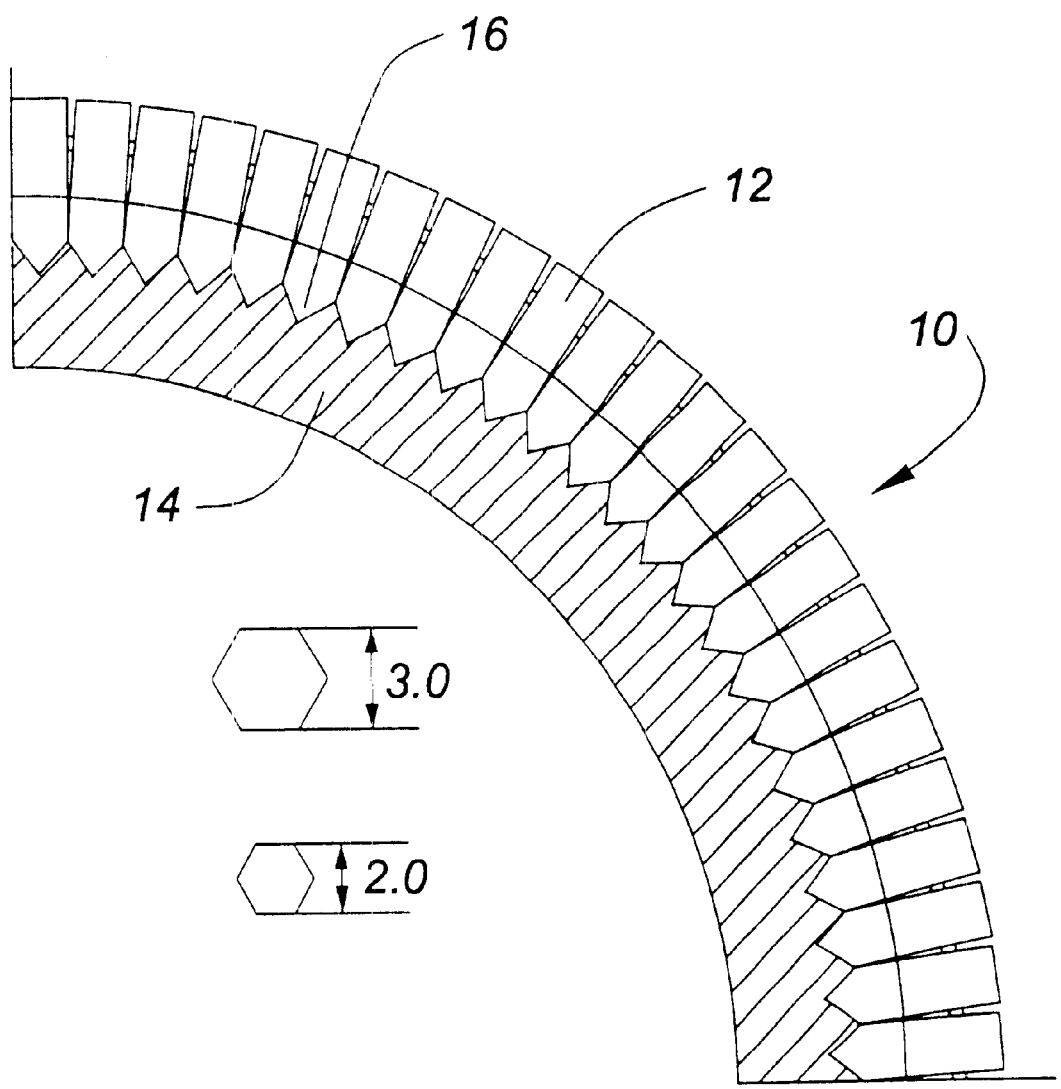
FIG. 1 is a schematic plan view of part of an electroform showing mold pins with their longitudinal angles set for a desired curvature in a matrix assembly.

Referring to FIG. 1, a matrix 10 includes a plurality of mold pins such as reflex pins 12 bundled together for the application of electroform material 14 over the heads 16 of the pins as illustrated. Selected ones of the pins 12 have their longitudinal axis varied relative to adjacent pins in the matrix so that those longitudinal axes are tapered with respect to one another towards the operative or reflex end 16 of the pins.

Figure 2:
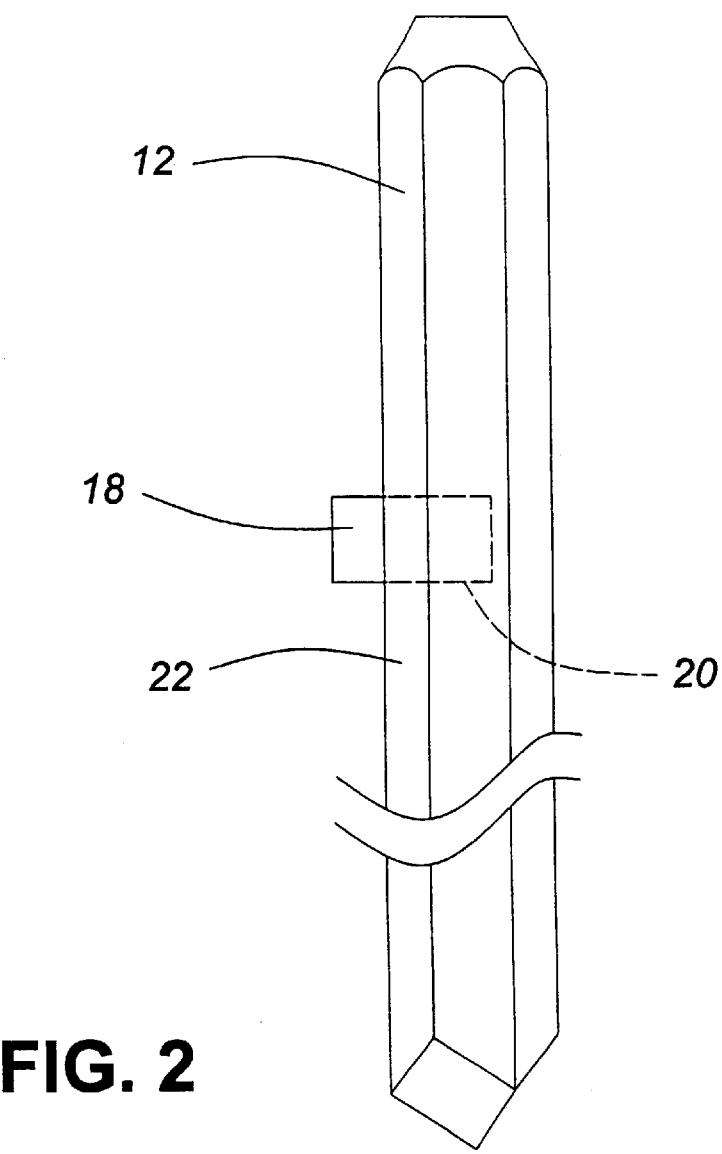
FIG. 2 is an elevation view of a reflex pin having tapering means thereon according to one embodiment of the present invention.
Figure 3:
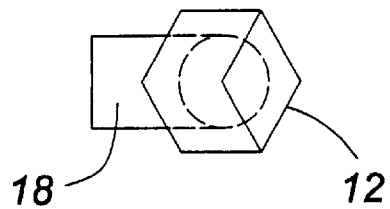
FIG. 3 is an end view of the mold pin shown in FIG. 2.

FIGS. 2 and 3 show one example of spacing means according to the invention. Pin 12 is provided with a dowel 18 in the sidewall thereof. A location on the side wall of the pin is selected and a socket 20 is drilled in the sidewall 22 normal to the longitudinal axis of the pin. The dowel is then inserted in the socket 20 so that the dowel 18 extends normal to the longitudinal axis of the pin. The length of protrusion of the dowel sets the degree of taper of the pin relative to adjacent pins in the matrix. The length of protrusion can be adjusted in various ways such as by grinding or the like.

Figure 4:
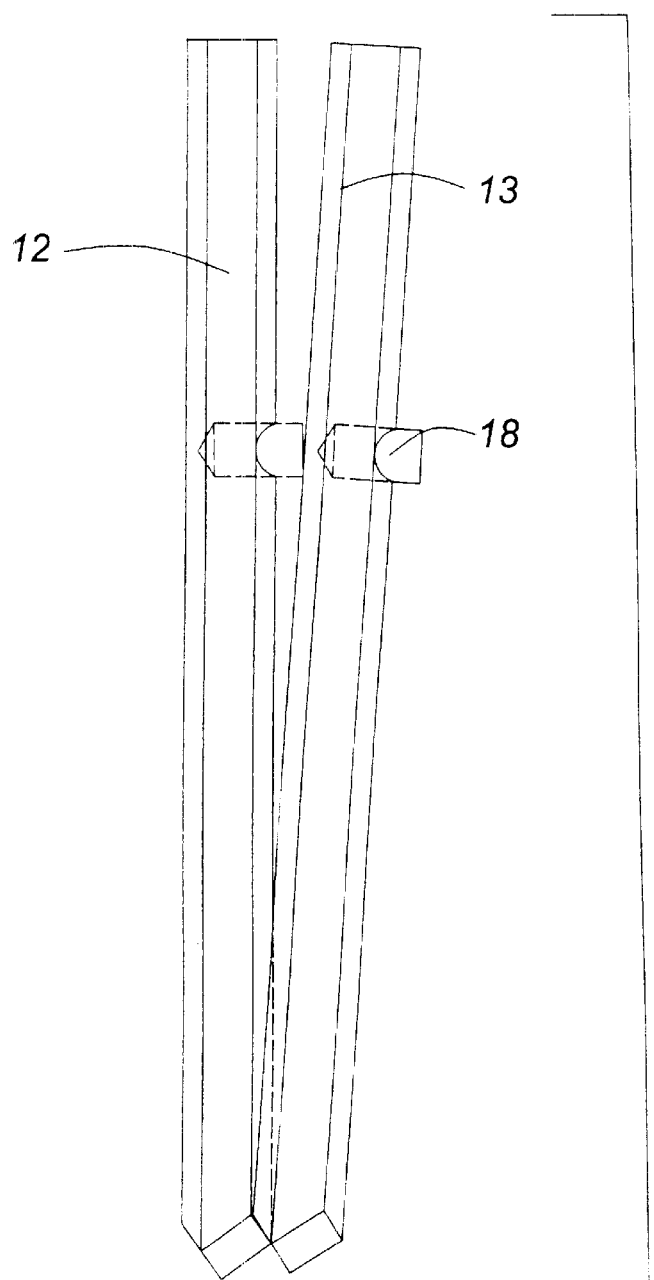
FIG. 4 is an elevation view of a plurality of pins having tapering means thereon according to one embodiment of the invention and arranged in a group simulating a portion of a matrix assembly.
Figure 4:
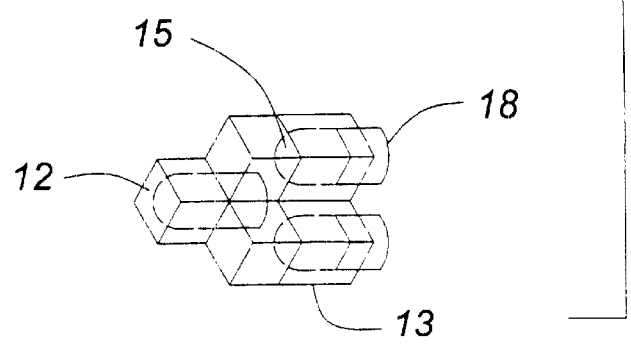

FIG. 4 illustrates an example of a plurality of pins 12, 13 and 15 having dowels 18 projecting therefrom and serving to space the upper ends of the pins from one another to the extent of a desired angle.

Figure 5:
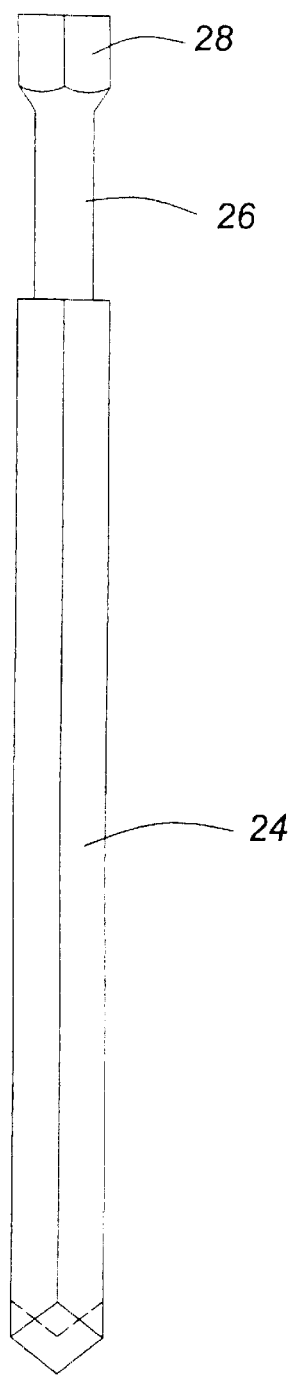
FIG. 5 is an elevation view of a mold pin according to a further embodiment of the invention.
Figure 6:
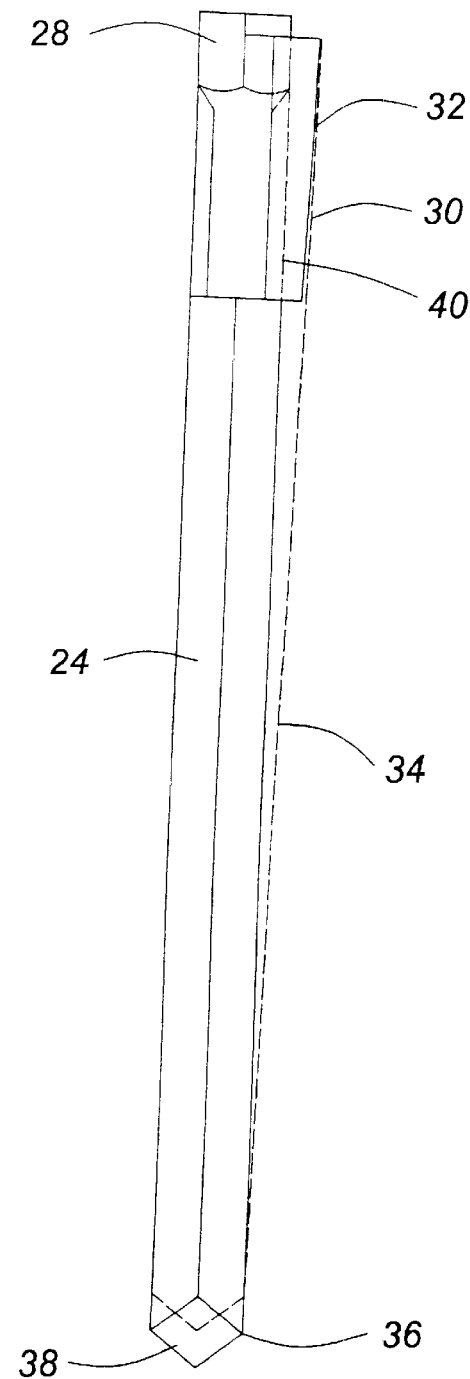
FIG. 6 is an elevation view similar to FIG. 5 showing tapering means applied thereto.
Figure 7:
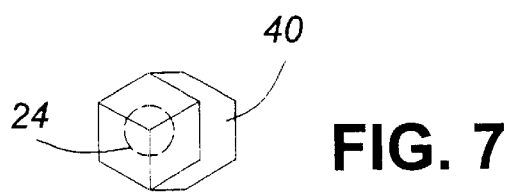
FIG. 7 is an end view of the pin shown in FIG. 6.

A further embodiment of the invention is illustrated in FIGS. 5, 6 and 7. A reflex pin has a portion of its upper end formed, for example by machining, to provide a reduced portion 26 leaving a head 28. Pin 24 is then placed in a mold 30 having a sidewall 32 tapered to a degree which, if extended, as illustrated by the dashed line 34, would meet the side of the pin adjacent the junction 36 with the head 38 of the pin. A collar 40 is then molded on to the upper end of the pin around the reduced portion as shown in FIG. 6 and, when cooled and removed from the mold, provides the collar 40 which constitutes the means for spacing that pin from adjacent ones in a matrix.

The central longitudinal axis of the collar 40 is offset from and is tapered with respect to the central longitudinal axis of the pin 24. It will be noted that the configuration of the offset collar 40 corresponds to that of the pin 24 from which it is offset.

It will be appreciated that the length of the collar and the width thereof (the amount offset from the pin) can be selected to meet the requirements of the spacing between the adjacent pins in the matrix.

Figure 8:
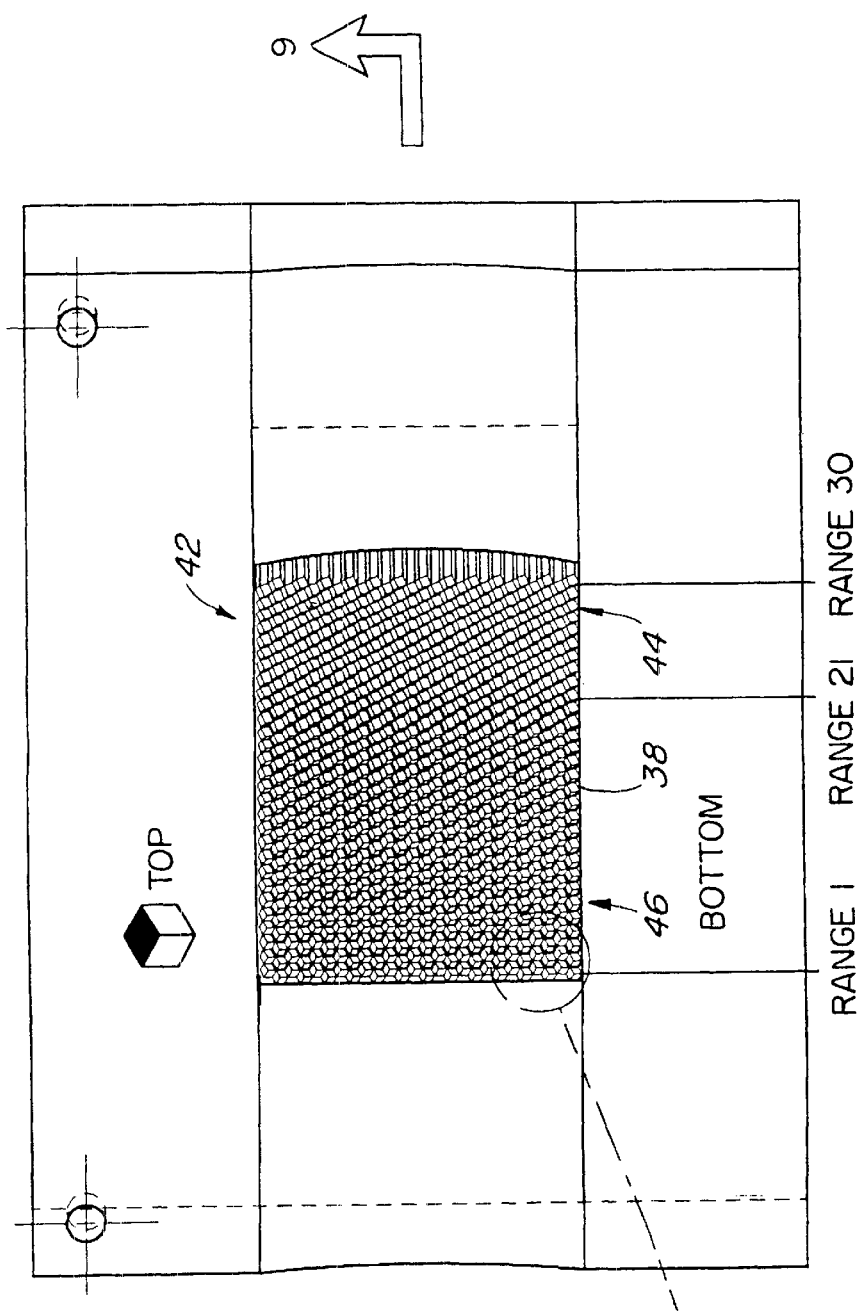
FIG. 8 is a plan view of a matrix assembly of a plurality of pins clamped together for making an electroform.
Figure 8:
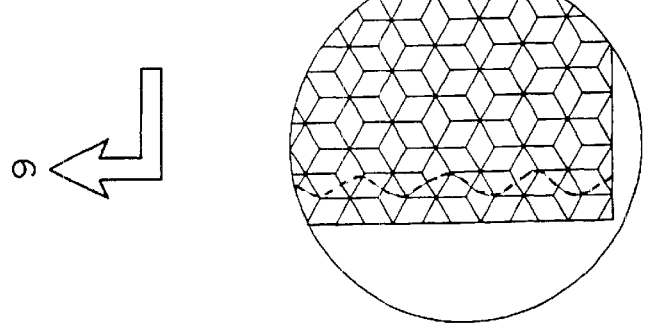
Figure 9:
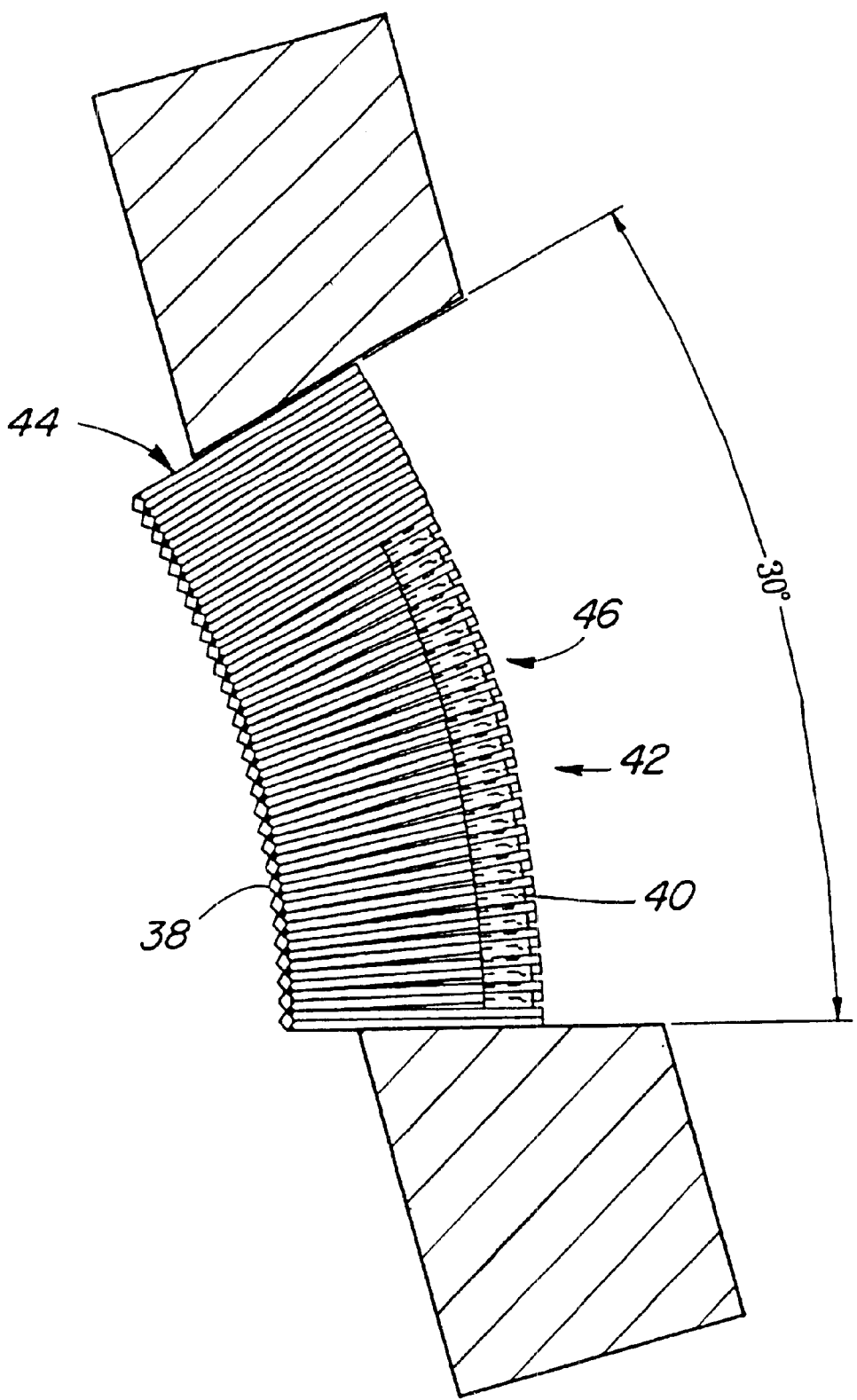
FIG. 9 is a sectional view taken along the line 9—9 of FIG. 8.

FIGS. 8 and 9 show a pin bundle 42 in a matrix consisting of a combination of a first group of pins 44 having their longitudinal axis parallel to one another and a second group of pins 46 having spacing means in the form of a collar 40 on each of the pins so that the longitudinal axis of the pins in group 46 have been altered with respect to adjacent pins in that group. As shown in FIG. 8, this has the result of orienting the longitudinal axis of the pins in group 46 so that the operative or reflex ends 38 of the pins are directed as desired.

The material for the spacing collar 40 should be a suitable high impact material such as polycarbonate, one that is resistant to acids and solvents and that adheres well to the pins.

While the invention has been described in connection with a specific embodiment thereof and in a specific use, various modifications thereof will occur to those skilled in the art without departing from the spirit and scope of the invention as set forth in the appended claims.

The terms and expressions which have been employed in this specification are used as terms of description and not of limitations, and there is no intention in the use of such terms and expressions to exclude any equivalents of the features shown and described or portions thereof, but it is recognized that various modifications are possible within the scope of the invention claims.

The embodiment of the invention in which an exclusive property or privilege is claimed are defined as follows:

1. A mold pin for use in a mold matrix and including an elongated shank and an operative end, said mold pin having a longitudinal axis and means for effectively altering the angle of the longitudinal axis of said mold pin relative to that of adjacent mold pins in said mold matrix whereby said longitudinal axis of said mold pins are tapered with respect to one another towards the operative ends thereof, said longitudinal axis angle altering means consisting of a socket located in a sidewall of the shank of said mold pin, and a spacing dowel secured in said socket and extending outwardly therefrom normal to said shank.

2. A mold pin according to claim 1 wherein said mold pin is a reflex pin.

3. A mold pin according to claim 1 wherein said mold pin is a reflex pin and said mold matrix is for use in the manufacture of a variable pin axis electroform.

4. A mold pin for use in a mold matrix and including an elongated shank and an operative end, said mold pin having a longitudinal axis and means for effectively altering the angle of the longitudinal axis of said mold pin relative to that of adjacent mold pins in said mold matrix whereby said longitudinal axis of said mold pins are tapered with respect to one another towards the operative ends thereof, said longitudinal axis angle altering means comprising a spacing member mounted on said mold pin at a location remote from the operative end thereof to space said remote location of said mold pin from adjacent mold pins in said matrix, said spacing member comprising a collar molded onto, and offset from, said mold pin shank and located adjacent to an end of said mold pin that is remote from the operative end thereof.

5. A mold pin according to claim 4 wherein said mold pin is a reflex pin.

6. A mold pin according to claim 4 characterized in that said collar has a longitudinal axis and said collar's longitudinal axis is offset from and tapered with respect to the longitudinal axis of the mold pin.

7. A mold pin according to claim 6 wherein the shank of said mold pin has a portion of reduced diameter and said collar is anchored therein.

8. A mold pin according to claim 4 wherein said collar has a configuration which corresponds to that of the mold pin from which it is offset.

* * * * *